US010165095B2

United States Patent
Xu et al.

(10) Patent No.: US 10,165,095 B2
(45) Date of Patent: Dec. 25, 2018

(54) ACTIVE REPORT OF EVENT AND DATA

(71) Applicant: Rockwell Automation Technologies, Inc., Mayfield Heights, OH (US)

(72) Inventors: Dayin Xu, Shanghai (CN); David Brandt, New Berlin, WI (US); Yi Yu, Shanghai (CN); Clifford J. Whitehead, Jr., Cleveland, OH (US); Guolin Zhang, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 178 days.

(21) Appl. No.: 14/746,087

(22) Filed: Jun. 22, 2015

(65) Prior Publication Data

US 2016/0373323 A1   Dec. 22, 2016

(51) Int. Cl.
  *G06F 15/173*   (2006.01)
  *H04L 29/08*   (2006.01)
  (Continued)

(52) U.S. Cl.
  CPC ........ *H04L 69/329* (2013.01); *G05B 19/4185* (2013.01); *G06F 9/00* (2013.01);
  (Continued)

(58) Field of Classification Search
  CPC ................... H04L 67/12; H04L 67/36; H04L 12/2803–12/2838; H04L 41/0246;
  (Continued)

(56) References Cited

U.S. PATENT DOCUMENTS

| 7,546,350 B2 | 6/2009 | Deen et al. |
| 8,803,667 B2 | 8/2014 | Bezdicek et al. |

(Continued)

FOREIGN PATENT DOCUMENTS

| CN | 1625881 | 6/2005 |
| CN | 101329564 | 12/2008 |

(Continued)

OTHER PUBLICATIONS

The Common Industrial Protocol (CIP™) and the Family of CIP Networks; Publication No. PUB00123R0; 2006 Open DeviceNet Vendor Association, Inc. (ODVA); Entire Document 92 pages; MI.

(Continued)

*Primary Examiner* — Brendan Y Higa
(74) *Attorney, Agent, or Firm* — Boyle Fredrickson, S.C.

(57) ABSTRACT

An electronic device in an industrial control system may be connected as a network device, such as via EtherNet/IP. The device may be configured to provide an "unconnected" message notification (or "active report") when the device detects an enumerated condition, such as an error or deviation. An unconnected message may be a message sent between two or more applications (which may be of the same or different devices) without pre-established communication channel bindings. An unconnected message may include routing path information for routing the message to the host computer, application path information for associating the applications, and data payload information related to at least one of a state of the electronic device and the enumerated condition.

18 Claims, 5 Drawing Sheets

(51) Int. Cl.
*H04L 12/24* (2006.01)
*H04L 12/28* (2006.01)
*G05B 19/418* (2006.01)
*H04L 12/26* (2006.01)
*G06F 9/00* (2006.01)

(52) U.S. Cl.
CPC ...... *H04L 12/2803* (2013.01); *H04L 12/2823* (2013.01); *H04L 41/0246* (2013.01); *H04L 41/0622* (2013.01); *H04L 43/065* (2013.01); *H04L 43/10* (2013.01); *H04L 67/10* (2013.01); *H04L 67/12* (2013.01); *G05B 19/4186* (2013.01); *H04Q 2209/823* (2013.01); *Y02P 90/02* (2015.11)

(58) Field of Classification Search
CPC .... H04L 41/0273; H04L 43/04–43/067; H04L 2012/284–2012/285; H04Q 2209/823; G05B 19/4185–19/4186
See application file for complete search history.

(56) References Cited

U.S. PATENT DOCUMENTS

| | | | |
|---|---|---|---|
| 2007/0186011 A1 | 8/2007 | Batke et al. | |
| 2008/0016436 A1* | 1/2008 | Liu | H04L 67/34 715/212 |
| 2008/0052757 A1* | 2/2008 | Gulati | H04L 41/0809 726/1 |
| 2010/0127881 A1* | 5/2010 | Schechter | H05K 7/20836 340/584 |
| 2011/0125921 A1* | 5/2011 | Karenos | H04L 45/00 709/240 |
| 2012/0290749 A1* | 11/2012 | Moench | G06F 9/445 710/63 |
| 2012/0310373 A1* | 12/2012 | Karaffa | G05B 19/4186 700/11 |
| 2013/0111087 A1 | 5/2013 | Kaufleitner | |
| 2013/0245843 A1* | 9/2013 | Bhageria | G06Q 10/04 700/287 |
| 2015/0222517 A1* | 8/2015 | McLaughlin | H04L 67/303 713/156 |
| 2016/0073346 A1* | 3/2016 | Nicks | H04W 52/0229 370/311 |

FOREIGN PATENT DOCUMENTS

| | | |
|---|---|---|
| CN | 102809953 | 12/2012 |
| EP | 1659470 | 5/2006 |
| EP | 1659470 A2 | 5/2006 |
| EP | 2530549 A2 | 12/2012 |
| WO | 2007117705 A2 | 10/2007 |

OTHER PUBLICATIONS

Extended European Search Report; EP Applicaton No. 16158161.6.

* cited by examiner

ACTIVE REPORT OF EVENT AND DATA

FIELD OF THE INVENTION

The present invention relates to the field of industrial control systems, and more particularly, to systems and methods for providing event and data notification and monitoring with respect to devices in industrial control systems.

BACKGROUND OF THE INVENTION

Industrial controllers are specialized computer systems used for the control of industrial processes or machinery, for example, in a factory environment. Generally, an industrial controller executes a stored control program that reads inputs from a variety of sensors associated with the controlled process or machine and, sensing the conditions of the process or machine, and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Generally industrial controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, EtherNet/IP, DeviceNet and ControlNet) differ from standard communication networks by guaranteeing maximum communication delays by pre-scheduling the communication capacity of the network, and/or providing seamless redundant communication capabilities for high-availability.

As part of their enhanced modularity, industrial controllers may employ I/O modules or devices dedicated to a particular type of electrical signal and function, for example, detecting input AC or DC signals or controlling output AC or DC signals. Each of these I/O modules or devices may have a connector system allowing them to be installed in different combinations in a housing or rack along with other selected I/O modules or devices to match the demands of the particular application. Multiple or individual I/O modules or devices may be located at convenient control points near the controlled process or machine to communicate with a central industrial controller via the control network.

Control networks may employ "connected messaging" in which the bandwidth of the network and buffer space is pre-allocated to dedicated "connections" to detect lost or unpredictably delayed data control message transfers or to guarantee client/server transaction integrity as in common Ethernet usage. An example of connected messaging is embodied within Common Industrial Protocol (CIP), which is a media independent industrial protocol for industrial automation applications supported by the Open DeviceNet Vendors Association (ODVA). CIP is described in "The Common Industrial Protocol (CIP) and the Family of CIP Networks," Copyright 2006, Open DeviceNet Vendor Association, Inc., which document is incorporated herein by reference in its entirety.

CIP encompasses a comprehensive suite of messages and services for the collection of manufacturing automation applications, including control, safety, synchronization, motion, configuration and other information. Application extensions to CIP include: CIP Safety, providing a communication between nodes such as safety I/O blocks, safety interlock switches, safety light curtains and safety PLC's in safety applications up to Safety Integrity Level (Sit) 3 according to IEC 61508 standards; CIP Motion, allowing integration of field devices and motion drives on the same network thereby eliminating the need for a separate motion optimized network; and CIP Sync, a time synchronization extension to CIP based on the recent IEEE-1588 standard—Precision Clock Synchronization Protocol for Networked Measurement and Control Systems—providing increased control coordination for sequencing demanding events recording, distributed motion control and other distributed applications. CIP maximizes compatibility among devices in an industrial system, and typical control networks implementing CIP include EtherNet/IP, DeviceNet, ControlNet and similar networks whose specifications are published and whose protocols are used broadly by a number of manufacturers and suppliers.

Devices in industrial control systems, including those which interact with industrial processes or machines (such as sensors, actuators, and process instruments), may sense, such as in an industrial process or machine, or in a communication or in the devices themselves, a variety a variety of enumerated conditions such as errors or deviations. It is therefore important to understand when such enumerated conditions occur in order to maintain the health of the system.

However, monitoring errors and deviations noted by the devices can be problematic. For example, continuously polling such devices, such as by an industrial controller periodically initiating CIP transactions with the devices, requires allocation from the limited pool of CIP connections for each device, and may require additional communication bandwidth (such as "keep-alive traffic" between an industrial controller and devices) to maintain CIP connections with each device. Also, continuously polling such devices results in unnecessary transactions, and in the event of an error, adds latency in reporting the error. Moreover, with particular devices that may have limited power, or may be limited by computational capability, memory, communication rate, or otherwise, continuous polling of the device may be particularly difficult to accomplish, if accomplishable at all.

It is therefore desirable to provide an industrial control system capable of monitoring devices with respect to errors and deviations that eliminates one or more of the foregoing disadvantages.

SUMMARY OF THE INVENTION

The inventors have recognized that an electronic device in an industrial control system may be connected via a network, such as via EtherNet/IP. The device may be configured to provide an "unconnected" message notification (or "active report") when the device detects an enumerated condition, such as an error or deviation. An unconnected message may be a message sent between two or more applications (which may be of the same or different devices) without pre-established communication channel bindings.

An unconnected message may include routing path information for routing the message to the host computer, application path information for associating the applications, and data payload information related to at least one of a state of the electronic device and the enumerated condition. Accordingly, an unconnected message may be sent from a device to a host without requiring either an application-level Common Industrial Protocol (CIP) connection or a transport-level Transmission Control Protocol (TCP) connection—both of which may consume substantial resources.

The active report may include in the data payload information a notification of the error or deviation, in addition to data relating to the error or deviation and/or state of the device. Such data could be provided in a fixed format, including: an Event ID, an Event Category, an Event Severity and/or a Timestamp. An Event ID may be constructed using object-oriented methods known in the art. For example, an Event ID of a CIP device may consist of CIP Class ID, Instance ID and Event Code.

Devices may actively report events for errors or deviations to hosts in the system (such as workstations, industrial controllers, HMI's, portable devices and the like), and the active reports may follow enumerated application paths using the application path information. Host computers may subscribe or unsubscribe to receiving active reports from devices with application paths, and may maintain data structures logging devices and active reports received from devices in the system. In one aspect, application paths may be used as a key to associate active reports from devices with subscriptions of clients. In another aspect, multiple events may be aggregated into one active report, and the one report may be multicast to multiple clients.

An aspect of the invention may provide an unconnected active report communication in which an on-demand, User Datagram Protocol (UDP) based message may be delivered with reliable delivery features (such as retrying and queueing) in industrial automation applications (which may include CIP applications). Report functions (such as subscribe, unsubscribe and notify functions) may be modeled as common services of CIP objects. Report content may include events (which may be prebuilt in an electronic device's applications) identified by Event ID (including, for example, Class ID, Instance ID and Event Code) or State data (including, for example, attributes of CIP objects) which may be identified by a data path (including, for example, Class ID, Instance ID and Attribute ID). Host computers may subscribe and/or unsubscribe to report content based on interests. An application path may serve as a key to identify a notification and associate it with the original subscription request. The application path is the path information contained in the unconnected message which will be used by the host computer to associate with the electronic device. In the case of an event report, the application path could include Alert Manager Class ID, Instance ID and Event ID; and in the case of a device state report, the application path may become the data path in the format of Object Class ID, Instance ID and Attribute ID. Aggregation of multiple subscriptions and notifications to reduce traffic may be provided. A host may detect an electronic device's presence by a subscription request. The electronic device may detect the host's absence by failure of delivery. An inhibit timer may be provided to avoid a report storm. Accordingly, non-intrusive on-demand traffic may be provided that minimizes a report's impact on time-critical traffic.

As used herein, a "connected message" is a message communicated between two applications in which there is a pre-established communication channel binding between applications. Also, an "unconnected message" is a message communicated between applications in which there is no pre-established communication channel binding between the applications. The applications may be application objects and may be of the same or different devices.

Persons of ordinary skill in the art will recognize that several levels of "bindings" between applications could exist. For example, "content level binding" could be provided in which a host computer may express interest in the contents of an electronic device for active reports. This may be analogous to a subscribe/unsubscribe arrangement. Also, "device addressing level binding" could be provided in which an Internet Protocol (IP) or similar level of binding occurs to update an electronic device as to where (such as which host computer) active reports should be routed. Also, "communication channel binding" could be provided to facilitate notification delivery from electronic devices to host computers. Looking to this latter fog aspects of the invention may provide unconnected messaging by sending a message between applications without a logical pre-established communication channel binding (although content level binding and/or device addressing level binding may exist).

Accordingly, devices may configure applications to send either connected messages or unconnected messages depending on configuring pre-established communication channel bindings to other applications. For example, communicating via connected messaging typically requires an established connection resource such as a. CIP Connection Identifier (CID) (an identifier assigned to a transmission that is associated with a particular connection between producers and consumers that identifies a specific piece of application information) over a connection path (a byte stream that defines the application object to which a connection instance applies), whereas communicating via unconnected messaging does not require such a connection resource over a connection path, thereby allowing a limited number of such connection resources to be allocated elsewhere. For example, communicating via connected messaging typically requires keep-alive traffic to maintain connections even if there is nothing to be reported from the device to the host, whereas communicating via unconnected messaging does not require such run-time traffic, thereby allowing saved network bandwidth to be used elsewhere (such as for a time-critical real-time communication application).

As a result, in a system which provides unconnected messaging, one or more advantages may be realized, such as (1) less stack overhead (such as for TCP and/or CIP connections) may be required by client devices and/or servers, (2) smaller message sizes, less memory and less communication bandwidth may be required, and/or (3) for multicast messages, less time to distribute events, less communication overhead, and less power consumption by client devices, intermediate routers and the like may be required.

Specifically then, one aspect of the present invention provides an industrial control system comprising a host computer including a processor executing a first application and an electronic device including a processor executing a second application. The electronic device may be in communication with the host computer through a control network. The electronic device may also be in communication with an industrial process or machine. The electronic device may further execute a program stored in a non-transient medium operable to: (a) detect an enumerated condition through the second application, and (b) in response to the enumerated condition, communicate an unconnected message to the first application of the host computer through the control network. An unconnected message may be a message communicated without a pre-established communication channel binding between applications.

Another aspect of the present invention provides a method for monitoring an electronic device in an industrial control system. The method may comprise: (a) executing a first application using a host computer; (b) executing a second application using an electronic device in communication with the host computer through a control network and in communication with an industrial process or machine; (c) detecting an enumerated condition through the second application; and (d) in response to the enumerated condition, communicating an unconnected message from the second application to the first application through the control network. An unconnected message may be a message communicated without a pre-established communication channel binding between applications.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE PREFERRED EMBODIMENT

Figure 1:
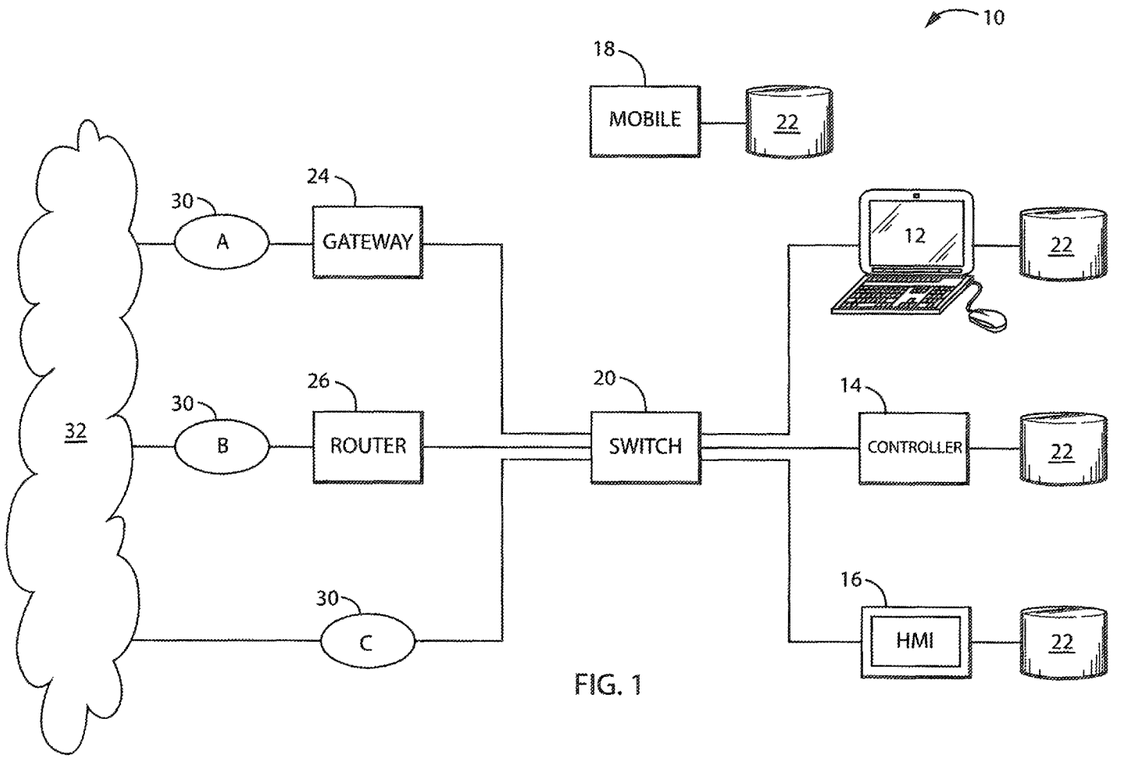
FIG. 1 is a block diagram of an exemplar industrial control system in accordance with an embodiment of the invention.

Referring now to FIG. 1, a block diagram of an exemplar industrial control system 10 is provided in accordance with an embodiment of the invention. In the industrial control system 10, a workstation 12, an industrial controller 14, a Human Machine Interface (EMI) 16 and a mobile device via wireless access point system 18 may each connect to a centralized switch 20 forming parts of a control network. The control network may be, for example, an EtherNet/IP network which guarantees maximum communication delays by pre-scheduling connections, and/or providing redundant communication, capabilities for high-availability.

The workstation 12, the industrial controller 14, the HMI 16 and the mobile device system 18 may each be a "host" computer in the industrial control system 10. Each host computer may be a computer including a processor executing one or more applications stored in a non-transient medium. Each host computer may also communicate with a database 22 for local event logging as will be further described with respect to FIGS. 2, 3 and 5. The workstation 12, the HMI 16 and/or the mobile device system 18 may be used to control the industrial controller 14; and the workstation 12, the HMI 16 and/or the mobile device system 18 may each include a graphical user interface for displaying aspects of the invention. In addition, the industrial controller 14 may be a Programmable Logic Controller (PLC) for controlling an industrial process or machine 32.

The switch 20, in turn, may connect with one or more additional network devices for implementing the control network. For example, the switch 20 may also connect to a gateway 24 and a router 26 and/or a wireless access point.

In addition, one or more electronic devices 30 may be provided in the industrial control system 10. The electronic devices 30 devices may have limited power, or may be limited in computational capability, memory, communication rate, or otherwise. The electronic devices 30 are illustrated in FIG. 1 by way of example as electronic devices "A," "B" and "C." In one configuration, electronic device A may be connected to the gateway 24, electronic device B may be connected to the router 26, and electronic device C may be connected to the switch 20. Each electronic device may be a low power, battery powered, or otherwise resource constrained device configured to interact and communicate with the industrial process or machine 32. For example, electronic device A could be a sensor for sensing a condition of the industrial process or machine 32, such as an optical detector or rotary counter; electronic device B could be an actuator for actuating a condition of the industrial process or machine 32, such as a motor or pump; and electronic device C could be a process instrument.

The electronic devices A, B and C may each include a processor executing one or more applications stored in a non-transient medium. In addition, the electronic devices A, B and C may each be connected to communicate with one or more host computers (such as the workstation 12, the industrial controller 14, the HMI 16 or the mobile device system 18) through the control network. Accordingly, the electronic devices A, B and C may communicate with the host computers via connected messaging or unconnected messaging. Also, the electronic devices A, B and C may be configured to detect an enumerated condition through their respective applications, such as detecting an error or deviation with respect to itself or the industrial process or machine 32. For example, enumerated conditions might include sensing a dirty lens, an overvoltage condition, reaching a temperature threshold, or reaching a predetermined time or count. A variety of enumerated conditions could be configured in the electronic device to detect errors or deviations as known in the art.

Figure 2:
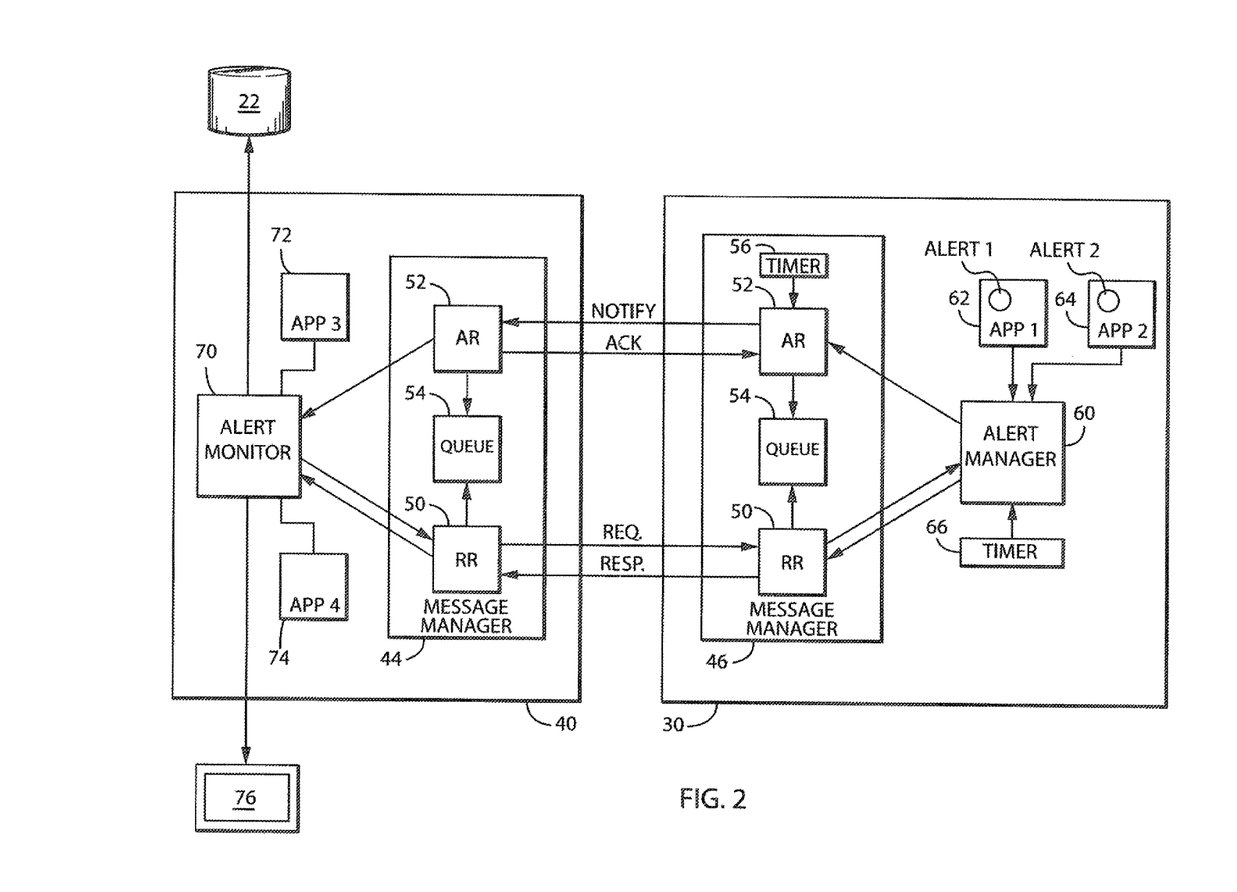
FIG. 2 is a block diagram of a host computer communicating with an electronic device for the electronic device alerting with respect to an enumerated condition in accordance with an embodiment of the invention.

Referring now to FIG. 2, a block diagram of a host computer 40 (which could be, for example, the workstation 12, the industrial controller 14, the HMI 16 or the mobile device system 18) communicating with the electronic device 30 (which could be for example, the electronic device A, B or C) is provided in accordance with an embodiment of the invention. The host computer 40 and the electronic device 30 are in communication via the control network. In addition, the electronic device 30 may be in communication with the industrial process or machine.

Although the host computer 40 and the electronic device 30 might in one aspect communicate with one another via a connection with a pre-established communication channel binding application objects which execute in each, such a connection would require consuming a connection resource. In addition, although the host computer 40 could continuously poll the electronic device 30, such as by periodically initiating CIP transactions with the electronic device 30, this would typically require establishing a CIP connection with the electronic device 30 (of which there may be a limited number of connections). Also, continuously polling the electronic device 30 would result in unnecessary transactions, and in the event of an error, would add latency in reporting the error. Moreover, the electronic device 30 may have limited power, or may be limited by computational capability, memory, communication rate, or otherwise, and continuous polling may be difficult to accomplish, if accomplishable at all. Consequently, in an aspect of the invention, the host computer 40 and the electronic device 30 may communicate with one another via unconnected messaging.

In particular, the host computer 40 and the electronic device 30 may implement first and second Unconnected Message Managers (UCMM) 44 and 46, respectively. The first and second UCMM's 44 and 46, respectively, may typically be responsible for establishing connections between devices that are not yet connected, but in this aspect, may also be responsible for processing unconnected explicit requests, responses, and active reports. The first and second UCMM's 44 and 46, respectively, may each include a Request/Response module 50, an Active Report module 52 and a Queue 54.

The Request/Response module 50 may serve to route subscribe and/or unsubscribe request messages and response (or acknowledgement) messages between the host computer 40 and the electronic device 30. A subscription request message is typically sent by a host computer to an electronic device to inform the electronic device to send active reports (or alerts) back to the host computer when they occur. Upon receiving a subscription request, the electronic device may send a response back to the host computer to acknowledge the subscription. Similarly, an un-subscribe request message could be sent by a host computer to an electronic device to inform the electronic device to cease sending active reports to the host computer (despite enumerated conditions which could trigger active reports continuing to occur). The electronic device may also send a response message (or acknowledgement) back to the host computer to acknowledge the unsubscribe request message. In this way, multiple host computers can selectively subscribe to active reports of one or more electronic devices, and cease subscribing to such reports, as the needs of the host computers may vary.

Following a subscription, the Active Report module 52 may serve to route active report messages from the electronic device 30 to the host computer 40 (a subscriber). The host computer 40 may, upon receiving an active report message, send an acknowledgement message back to the electronic device 30. In the absence of an acknowledgement message, the electronic device 30 may retry sending the active report message, again and again, until an acknowledgement message is received, or a timeout condition occurs via an active report timer 56, to ensure delivery.

In the electronic device 30, an alert manager object 60 (which may be an application object) may communicate with one or more application objects also in the electronic device 30, such as first and second application objects 62 and 64, respectively, to manage the active report process for providing alerts. In particular, the alert manager object 60 may provide storm control, aggregation (of active reports and subscriptions), buffering and filtering, and may implement subscribe, notify and unsubscribe functions.

The first and second application objects 62 and 64, respectively, may be object oriented program objects without pre-established communication channel bindings to application objects, such as an application object in the host computer 40. An enumerated condition occurring in the first and second application objects 62 or 64, respectively, such as "Alert 1" or "Alert 2" as illustrated, respectively, may cause the alert manager object 60 to generate an alert for reporting to subscribed host computers via an unconnected message. An inhibit timer 66 may also be initiated with respect to the alert manager object 60 to avoid a report storm in which a significant amount of alerts are sent close in time thereby limiting network bandwidth. The alert active report may be identified by the host computer (and/or other subscribers) by application path information (such as Class ID of the alert manager object 60, Instance ID and Event ID).

With respect to the host computer 40, an alert monitor object 70 (which may be an application object) may operate to selectively identify and subscribe to active reports of one or more electronic devices based on the needs of applications running on the host computer 40, such as the application object 72. The alert monitor object 70 may also log active report activity in the database 22 and/or display active report activity, including the enumerated condition and/or state of the electronic device 30, to an electronic display 76.

Accordingly, an alert monitor object 70, implemented in the host computer 40, could subscribe to the electronic device's 30 alerts based on interests. The electronic device 30 could then notify the alert monitor object 70 (and other subscribers) of alerts, such as for logging and displaying, by unicast or multicast, via unconnected messaging. Also, the host computer 40 could aggregate alert subscriptions to the electronic device 30, and the electronic device 30 could aggregate alert notifications to multiple subscribers (host computers), and may send via multicast unconnected messaging. In the case of multicast unconnected messaging, the electronic device 30 may maintain a multicast member list and an acknowledgement list, and may mark acknowledgements as they are received. This typically saves half of the messages compared to unicast messaging. If the multicast notification itself is lost, no acknowledgement will be received and the same multicast message will be re-sent by the electronic device 30. If one or a few acknowledgements are lost, then the same multicast message may also be resent. The subscribers (such as the host computers) that have already received the message would not necessarily acknowledge again because they would consider it a repetition as they had already advanced their expected transaction ID. Also, if the multicast must be resent too may times in a row, the electronic device 30 may consider the subscribers (such as the host computers) to have failed, and may delete such failed subscribers from the multicast member list accordingly.

Figure 3:
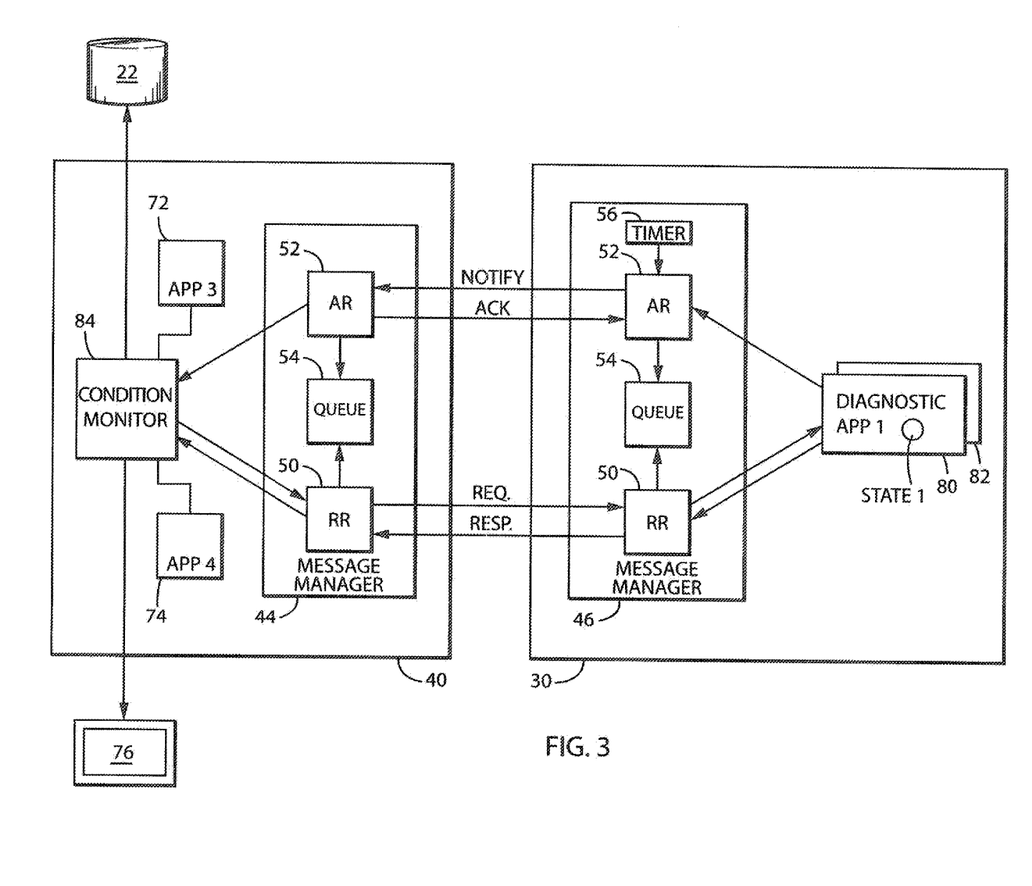
FIG. 3 is a block diagram of a host computer communicating with an electronic device for monitoring the electronic device with respect to a state in accordance with an embodiment of the invention.

Referring now to FIG. 3, in an alternative aspect in which like reference numerals represent like parts, the electronic device 30 may include diagnostic objects 80 and 82, which may be object oriented program objects without pre-established communication channel bindings to application objects, such as an application object in the host computer 40. An enumerated condition occurring, for example, in the diagnostic object 80, such as a state change represented by "State 1" as illustrated, may cause the diagnostic object 80 to generate a notification active report for reporting to subscribed host computers via an unconnected message.

The notification active report may be identified by the host computer (and/or other subscribers) by application path information (such as Class ID, Instance ID and Attribute ID). Other diagnostic objects which have state data to be reported may similarly implement subscribe, notify and unsubscribe via, common services. Accordingly, a condition monitor object 84, implemented in the host computer 40, could subscribe to the electronic device's 30 state data (such as attributes of objects) based on interests. The electronic device 30 could then notify the condition monitor object 84 (and other subscribers) of a changed state data for condition monitoring, by unicast or multicast, via unconnected messaging. Also, the host computer 40 could aggregate state data subscriptions to the electronic device 30, and the electronic device 30 could aggregate state data notifications to multiple subscribers (host computers), and may send via multicast unconnected messaging.

Figure 4:
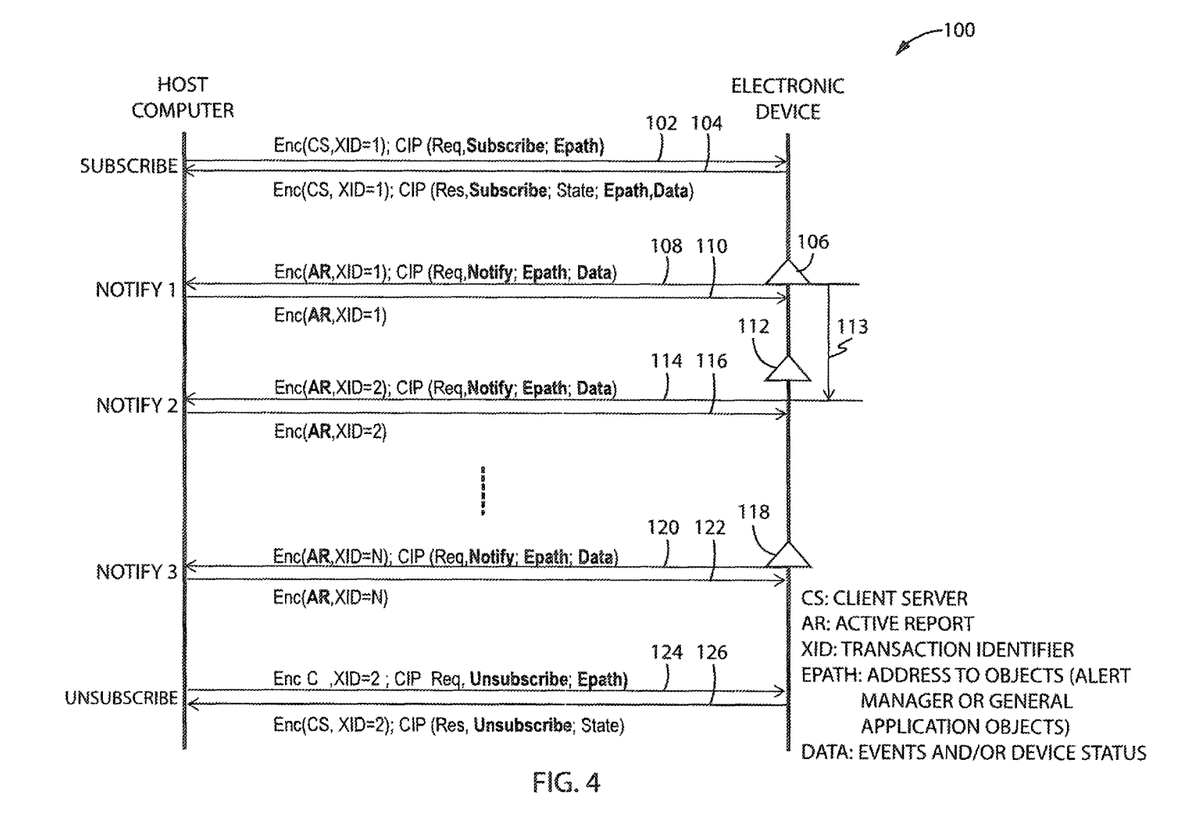
FIG. 4 is a line diagram illustrating an exemplar message sequencing between a host computer and an electronic device in accordance with an embodiment of the invention.

Referring now to FIG. 4, a line diagram 100 illustrating exemplar message sequencing between a host computer and an electronic device is provided in accordance with an embodiment of the invention. Initially, a host computer may send an unconnected message 102 to an electronic device to subscribe to alerts and/or notifications of the electronic device. Unconnected messages may be sent using "encapsulation" (used by layered protocols) in which a layer adds header information to the protocol data unit (PDU) from the layer above for purposes of carrying one protocol within another. The unconnected message 102 may include application path information ("Epath") as described above with respect to FIGS. 2 and 3.

Next, the electronic device may send an unconnected message 104 back to the host computer acknowledging the subscription. The unconnected message 104 may include path information, state and/or data information as described above with respect to FIGS. 2 and 3.

Upon an enumerated condition 106 occurring, the electronic device may detect the enumerated condition 106, which may be an error, deviation or state change with respect to the electronic device itself and/or an industrial process or machine in which the electronic device communicates with and interacts. For example, the electronic device may detect an overvoltage condition, reaching a temperature threshold, reaching a predetermined count, and so forth. The electronic device may detect the enumerated condition through a running application object. As illustrated by "Notify 1," in response to the enumerated condition 106, the electronic device may send an unconnected message 108 to provide an active report alert/notification to the subscribers (in this case, the host computer). The unconnected message 108 may be provided to an application object running on the host computer without a pre-established communication channel binding between the application object running on the electronic device (through which the enumerated condition was detected) and the application object running on the host computer. Accordingly, the unconnected message 108 may again include path information and/or data information. The host computer may then send an unconnected message 110 back to the electronic device acknowledging the notification.

Notifications may continue to proceed in this active report, each followed by an acknowledgement as illustrated with, respect to "Notify 2" and "Notify 3." If an acknowledgement is not received by each subscriber with a predetermined amount of time, the electronic device may retry by again re-sending the unconnected message. Also, if multiple unconnected messages are received by the host computer, such as by multiple electronic devices, the host computer may queue the incoming unconnected messages for orderly processing.

In addition, as described above with respect to FIG. 2, in a preferred embodiment, the electronic device may also be configured to delay sending an unconnected message by a predetermined amount of time in order to avoid a traffic storm. For example, as shown in FIG. 4, following the enumerated condition 106, the electronic device may wait a predetermined amount of time 113 before reporting a next enumerated condition 112, illustrated by "Notify 2." This may be despite the fact that the next enumerated condition 112 occurred well before the predetermined amount of time 113. Accordingly, the electronic device may help to avoid a traffic storm.

Finally, the host computer may send an unconnected message 124 to the electronic device to unsubscribe to alerts and/or notifications of the electronic device. The unconnected message 124 may similarly include path information.

Next, the electronic device may send an unconnected message 126 back to the host computer acknowledging the un-subscription. The unconnected message 126 may include state and/or data information as described above.

Figure 5:
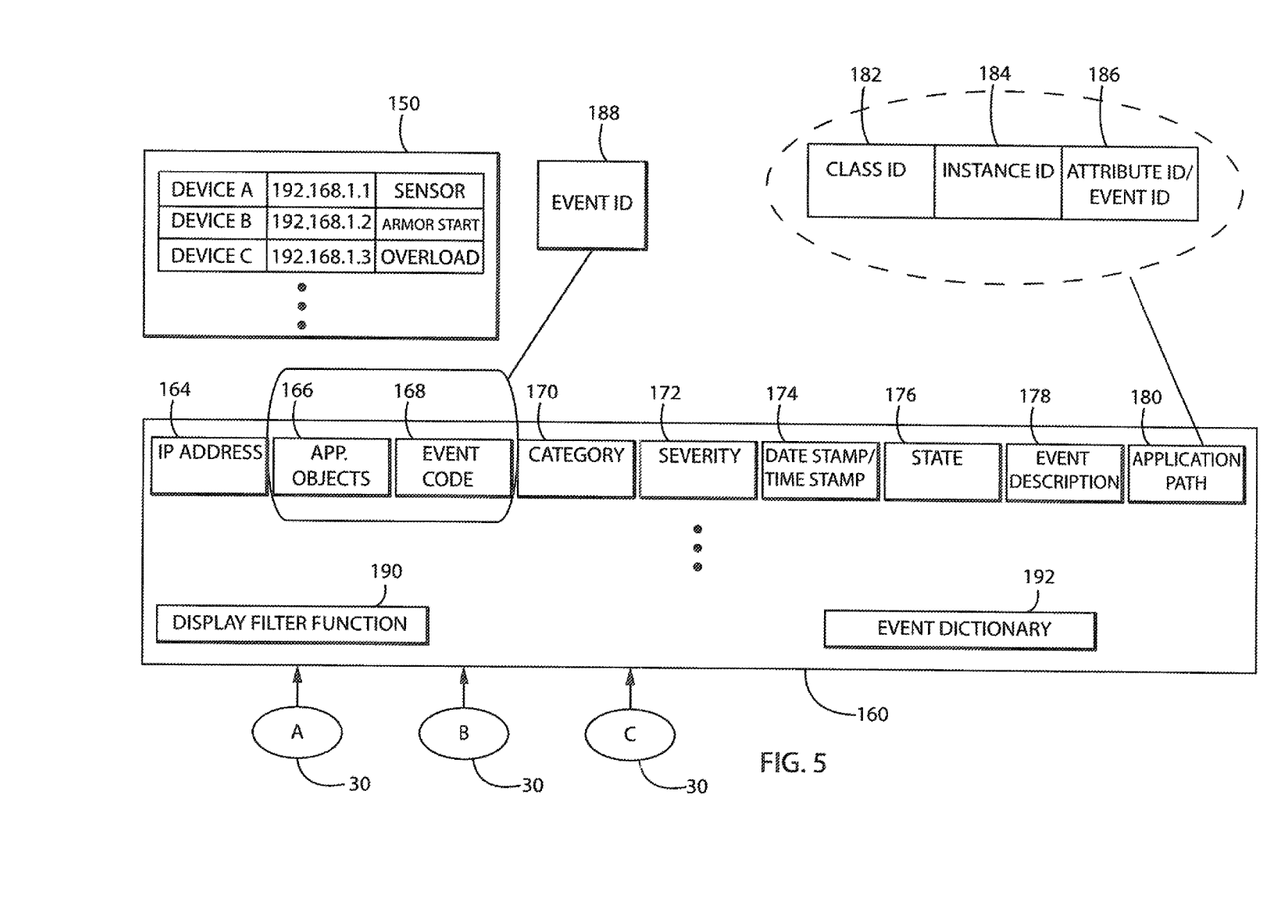
FIG. 5 is an exemplar device list and event log and display in accordance with an embodiment of the invention.

Referring now to FIG. 5, an exemplar device list 150 and event log and display 160 are provided in accordance with an embodiment of the invention. The device list 150 may provide a list of the electronic devices that are subscribed to by a host computer. For example, the device list 150 may include in a first row a device name, such as "Device A," an address for the device, such as the IP address 192.168.1.1 and/or description field for the device, such as a "Sensor." "Device B" and "Device C" may similarly be listed, thereby indicating the host computer is subscribed to event reports from Device A, Device B and Device C. Each host computer may maintain its own device list 150, such as in the database 22.

The event log and display 160 may provide a more detailed listing with respect to active reports 162 that may be received by the host computer from an electronic device. Fields may include an IP address 164 of the electronic device, information with respect to application objects 166 of the electronic device, an event code 168, an event category 170, an event severity 172, a date stamp time stamp 174, a state 176 of the electronic device, an event description 178 and/or an application path 180.

The application path 180 may further include, for example, a Class identifier (Class ID) 182, an Instance identifier (Instance ID) 184 and/or an Attribute Identifier (Attribute ID) 186 or an Event ID 188. The Class ID 182 may be an integer identification value assigned to each object class accessible from the network. The Instance ID 184 may be an integer identification value assigned to an object instance that identifies it among all instances of the same class. The Attribute ID 186 may be an integer identification value assigned to a class or instance attribute. The Event ID 188 may consist of Class ID, Instance ID and Event Code. As previously described, in the case of an event report, the application path may include Alert Manager Class ID, Instance ID and Event ID, and in the case of a state report, the application path may include application object Class ID, Instance ID and Attribute ID.

The device list 150 and the event log and display 160 may be graphically displayed by the host computer, such as to a screen of the workstation 12 or the HMI 16, thereby providing display of the reported enumerated condition. A display filter function 190 may permit a user to filter and/or sort particular fields of the active reports 162 to the display screen. Also, an event dictionary 192 may permit a user to call to the screen definitions with respect to the fields of the active reports 162.

Although embodiments have been described in the context of a control network based on EtherNet/IP, in other aspects of the invention, alternative types of control networks may be used. For example, embodiments of the invention may be implemented using ControlNet. DeviceNet and SERCOS networks, among others, whose specifications are published and whose protocols are used broadly by a number of manufacturers and suppliers.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof; and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processors can be configured to operate on one or more processor-controlled devices that can be similar or different devices. Furthermore, references to memory, unless otherwise specified, can include one or more processor readable and accessible memory elements and/or components that can be internal to the processor-controlled device, external to the processor-controlled device, and/or can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. An industrial control system comprising:
a host computer including a processor executing a first application; and
an electronic device being a sensor or actuator, the electronic device including a processor executing a second application, the electronic device being in communication with the host computer through a control network, the electronic device further being in communication with an industrial process or machine, the electronic device further executing a program stored in a non-transient medium operable to:
(a) detect an enumerated condition through the second application, and
(b) in response to the enumerated condition, communicate an unconnected message to the first application of the host computer through the control network, wherein an unconnected message is a message communicated without a pre-established communication channel binding between applications,
wherein the electronic device is configured to communicate the message to the host computer after receiving a subscribe request from the host computer, and
wherein the unconnected message is a Common Industrial Protocol (CIP) explicit message, and the first and second applications are first and second CIP application objects.

2. The industrial control system of claim 1, wherein the message includes routing path information for routing the message to the host computer, application path information related to the second application of the electronic device, and data payload information related to a state of the electronic device or the enumerated condition.

3. The industrial control system of claim 2, wherein the host computer is operable to associate the application path information with the electronic device.

4. The industrial control system of claim 1, wherein the host computer is a first subscriber, and further comprising a second a subscriber, wherein the electronic device is operable to communicate the message as a multicast message to the first and second subscribers.

5. The industrial control system of claim 1, wherein the electronic device is operable to cease communicating messages to the host computer after receiving an unsubscribe request from the host computer.

6. The industrial control system of claim 1, wherein the host computer includes a Human Machine Interface (HMI) operable to display the enumerated condition and a database to log the enumerated condition.

7. The industrial control system of claim 1, wherein the host computer is a Programmable Logic Controller (PLC).

8. The industrial control system of claim 1, wherein the electronic device suspends communication during a sleep mode.

9. The industrial control system of claim 1, wherein the electronic device is an optical detector, a rotary counter, a motor or a pump.

10. The industrial control system of claim 1, wherein the host computer is an industrial controller.

11. A method for monitoring an electronic device in an industrial control system, the method comprising:
(a) executing a first application using a host computer;
(b) executing a second application using an electronic device in communication with the host computer through a control network and in communication with an industrial process or machine, the electronic device being a sensor or actuator;
(c) detecting an enumerated condition through the second application;
(d) in response to the enumerated condition, communicating an unconnected message from the second application to the first application through the control network, wherein an unconnected message is a message communicated without a pre-established communication channel binding between applications; and (e) the electronic device receiving a subscribe request from the host computer, and the electronic device communicating the message to the host computer after receiving the subscribe request, and wherein the unconnected message is a Common Industrial Protocol (CIP) explicit message, and the first and second applications are first and second CIP application objects.

12. The method of claim 11, wherein the message includes routing path information for routing the message to the host computer, application path information related to the second application of the electronic device, and data payload information related to a state of the electronic device or the enumerated condition.

13. The method of claim 12, further comprising the host computer associating the application path information with the electronic device.

14. The method of claim 11, wherein the host computer is a first subscriber, and further comprising communicating the message as a multicast message to first and second subscribers.

15. The method of claim 11, further comprising the electronic device receiving an unsubscribe request from the host computer, and the electronic device ceasing to communicate messages to the host computer after receiving the unsubscribe request.

16. The method of claim 11, further comprising displaying the enumerated condition to a Human Machine Interface (HMI) of the host computer and logging the enumerated condition to a database of the host computer.

17. The method of claim 11, further comprising the electronic device suspending communication during a sleep mode.

18. The method of claim 11, wherein the electronic device is an optical detector, a rotary counter, a motor or a pump.

\* \* \* \* \*